(12) United States Patent
Song et al.

(10) Patent No.: US 11,629,766 B2
(45) Date of Patent: *Apr. 18, 2023

(54) ELECTRO-MECHANICAL BRAKE AND VEHICLE COMPRISING THE SAME

(71) Applicant: HL MANDO CORPORATION, Gyeonggi-do (KR)

(72) Inventors: Joon-Kyu Song, Gyeonggi-do (KR); Pyeong Kook Son, Gyeonggi-do (KR); Jin Seok Kim, Gyeonggi-do (KR); Woochul Lim, Gyeonggi-do (KR); Dae June Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,551

(22) Filed: Aug. 11, 2022

(65) Prior Publication Data

US 2023/0062142 A1    Mar. 2, 2023

(30) Foreign Application Priority Data

Aug. 11, 2021    (KR) .................... 10-2021-0106113

(51) Int. Cl.
*F16D 55/16*    (2006.01)
*F16D 65/18*    (2006.01)
(Continued)

(52) U.S. Cl.
CPC .......... *F16D 65/18* (2013.01); *F16D 2121/24* (2013.01); *F16D 2125/40* (2013.01); *F16D 2125/48* (2013.01)

(58) Field of Classification Search
CPC .. F16D 65/18; F16D 2121/24; F16D 2125/40; F16D 2125/48
See application file for complete search history.

(56) References Cited

U.S. PATENT DOCUMENTS

2005/0064980 A1*    3/2005    Hoshi ..................... F16H 57/02
                                                                   475/257
2007/0062769 A1*    3/2007    Noh ....................... B60T 13/588
                                                                   188/162
(Continued)

FOREIGN PATENT DOCUMENTS

DE    11 2018 004 232    3/2022
JP    2008-115880    5/2008
(Continued)

OTHER PUBLICATIONS

Notice of Allowance dated May 12, 2022 for Korean Patent Application No. 10-2021-0106113 and its English translation provided by Applicant's foreign counsel.
(Continued)

*Primary Examiner* — Nicholas J Lane
(74) *Attorney, Agent, or Firm* — Ladas & Parry, LLP

(57) ABSTRACT

An electro-mechanical brake and a vehicle including the same are provided. As an electro-mechanical brake according to an aspect of the present invention, an electro-mechanical brake including a pair of brake pads disposed on both sides of a disc, may include a motor that provides a rotational driving force; a rotating screw that rotates about a second rotating shaft parallel to a first rotating shaft of the motor; a power transmission unit that transmits the rotational driving force of the motor to the rotating screw; and a piston that is coupled to the rotating screw to be able to move forward and backward to press the disc with the brake pads.

12 Claims, 13 Drawing Sheets

(51) Int. Cl.
    *F16D 125/48*     (2012.01)
    *F16D 125/40*     (2012.01)
    *F16D 121/24*     (2012.01)

(56) References Cited

U.S. PATENT DOCUMENTS

| | | | | |
|---|---|---|---|---|
| 2011/0147143 | A1* | 6/2011 | Park | B60T 13/746 188/158 |
| 2014/0231189 | A1* | 8/2014 | Park | F16D 65/18 188/72.3 |
| 2016/0355169 | A1* | 12/2016 | Ohlig | B60T 13/741 |
| 2021/0016760 | A1* | 1/2021 | Hong | B60T 13/741 |
| 2022/0024434 | A1* | 1/2022 | Baek | F16D 55/226 |
| 2022/0297660 | A1* | 9/2022 | Lim | F16D 55/02 |
| 2022/0324425 | A1* | 10/2022 | Kim | B60T 17/221 |
| 2022/0324427 | A1* | 10/2022 | Puiu | B60T 13/746 |

FOREIGN PATENT DOCUMENTS

| | | |
|---|---|---|
| JP | 2008-275053 | 11/2008 |
| KR | 10-2012-0083038 | 7/2012 |
| KR | 10-2013-0059492 | 6/2013 |
| KR | 10-1549995 | 9/2015 |
| KR | 10-2021-0042587 | 4/2021 |

OTHER PUBLICATIONS

Office Action dated Feb. 15, 2022 for Korean Patent Application No. 10-2021-0106113 and its English translation from Global Dossier.

Office Action dated Dec. 7, 2022 for German Patent Application No. 10 2022 120 333.6 and its English translation by Google Translate.

* cited by examiner

700 : 720, 721, 740, 760

ELECTRO-MECHANICAL BRAKE AND VEHICLE COMPRISING THE SAME

CROSS REFERENCE TO RELATED APPLICATION

The present application claims priority to Korean Patent Application No. 10-2021-0106113, filed Aug. 11, 2021, the entire contents of which is incorporated herein for all purposes by this reference.

BACKGROUND OF THE INVENTION

Field of the Invention

The present invention relates to an electro-mechanical brake and a vehicle including the same, and more particularly, to an electro-mechanical brake that provides a pressurizing force using a rotational driving force of a motor, and a vehicle including the same.

Description of the Related Art

In general, a brake device is a device for stopping a vehicle from moving during braking or parking, and serves to hold the wheels of the vehicle from rotating.

Recently, an electro-mechanical brake (EMB) system for electronically controlling the driving of a brake has been developed. Such an electro-mechanical brake can be operated not only through a driver's manual operation, but also can be operated automatically in the case of a vehicle to which an autonomous driving system is applied, so it is very convenient and can realize the luxury of the vehicle.

Among these electro-mechanical brakes, in the case of an electro-mechanical brake that provides a braking force to the vehicle by pressing a disc, the rotational driving force of a motor is transmitted to a screw-nut structure to be screwed to press the disc using the screw or nut to control the rotation of the disc.

In this case, since the rotational driving force of the motor cannot be directly transmitted to the screw or nut, power is transmitted from the motor to the screw or nut by using a plurality of gears for deceleration. In a conventional electro-mechanical brake, there has been a problem in that the gears for transmitting power are arranged in a line, and the load due to the rotational force acts greatly, thereby reducing durability.

Meanwhile, conventionally, a driving force is provided only to a parking brake for parking using an electronically controllable motor, and a driving force is provided to a service brake for driving control through a generally used hydraulic pressure. As such, when the parking brake and the service brake are separately provided, there are problems in that not only the overall weight of the vehicle increases, but also the space occupied by the interior of the vehicle increases.

Accordingly, the demand for an electro-mechanical brake capable of efficiently utilizing the space inside the vehicle by removing the hydraulic line by enabling electronic control while performing the parking brake and driving brake functions as a single device is increasing.

On the other hand, a plurality of pistons (usually two pistons are applied) is provided in a vehicle such as a large truck requiring a large braking force and used to perform a braking operation.

However, when a plurality of pistons is provided and a driving force is transmitted from a single motor, a load is non-uniformly transmitted to the plurality of pistons according to the non-uniform initial position of the pistons. Thus, there are problems such as uneven wear of brake pads due to asymmetry, uneven wear of gears, and overload of motors. Accordingly, there is a problem in that braking performance is deteriorated.

In order to solve this, even if the motors having the same number as the number of pistons are provided to transmit power to each of the plurality of pistons, there is a problem in that it is difficult for application due to the increase in weight and cost, as well as the narrow installation space.

Documents of Related Art (Patent Document 1) KR 10-2021-0042587 A1 (Caliper braker)

SUMMARY OF THE INVENTION

In order to solve the above problems, an object of the present invention is to provide an electro-mechanical brake capable of providing a braking force electronically.

An object of the present invention is to provide an electro-mechanical brake that increases the durability of a gear by reducing the load applied to a plurality of gears for transmitting the driving force of a motor.

An object of the present invention is to provide an electro-mechanical brake capable of electronically providing service brake and parking brake functions without a hydraulic line.

An object of the present invention is to provide an electro-mechanical brake with relatively little damage and less backlash of a rotating screw in a brake environment where dust and foreign substances are easily generated.

An object of the present invention is to provide an electro-mechanical brake capable of providing sufficient braking forces even when a brake pad is worn.

An object of the present invention is to provide an electro-mechanical brake capable of maintaining the braking force of a brake in a parking situation.

An object of the present invention is to provide an electro-mechanical brake in which a braking force is increased by applying a stronger load to a brake pad.

The objects of the present invention are not limited to the objects mentioned above, and other objects not mentioned will be clearly understood by those skilled in the art from the description below.

In order to achieve the above objects, as an electro-mechanical brake according to one aspect of the present invention, an electro-mechanical brake including a pair of brake pads disposed on both sides of a disc, includes a motor that provides a rotational driving force; a rotating screw that rotates about a second rotating shaft parallel to a first rotating shaft of the motor; a power transmission unit that transmits the rotational driving force of the motor to the rotating screw; and a piston that is coupled to the rotating screw to be able to move forward and backward to press the disc with the brake pads. The power transmission unit may include a first gear coupled to the first rotating shaft of the motor, a second gear coupled to the second rotating shaft of the rotating screw, and a third gear engaging with the first gear and the second gear and rotating about a third rotating shaft spaced apart from a plane including the first rotating shaft and the second rotational shaft.

Here, the electro-mechanical brake may further include a planetary gear structure that includes one side coupled to a rear end of the rotating screw. The second gear may be coupled to the other side of the planetary gear structure.

Here, the first gear, the second gear and the third gear may be helical gears.

Here, the electro-mechanical brake may further include a ball nut that is coupled to the rotating screw. The rotating screw may include a first body portion to which the ball nut is coupled, and a second body portion formed behind the first body portion and coupled to the second gear. The piston may be formed in a cup shape with an opening at a rear thereof, and the ball nut may be inserted into the opening of the piston to press the piston forward.

Here, the electro-mechanical brake may further include a connector that is formed to surround a front end of the ball nut in order to be pressed forward by the ball nut, and includes a first screw thread formed on an outer peripheral surface thereof. A second screw thread screw-coupled to the first screw thread may be formed on an inner peripheral surface of the piston.

Here, an inclined surface may be formed on a front edge portion of the ball nut along a circumference, a support surface corresponding to the inclined surface may be formed on an inner peripheral surface of a front side of the connector so as to be pressed by the inclined surface.

Here, the rotating screw may further include a third body portion formed between the first body portion and the second body portion. The first body portion, the third body portion, and the second body portion may be formed such that a size of a cross-section perpendicular to a longitudinal direction is sequentially decreased. The electro-mechanical brake may include a supporter that is disposed on an outer peripheral surface of the third body portion and includes a front surface supported on an edge portion of a rear end of the first body portion, and an elastic that includes one side coupled to the supporter and the other side coupled to the ball nut to pull the ball nut toward the supporter.

Here, the electro-mechanical brake may further include a thrust bearing disposed at a rear of the supporter to support a load according to an axial force of the rotating screw.

Here, the electro-mechanical brake may further include a rotation preventing unit that controls the third gear to rotate in only one direction.

Here, the rotation preventing unit may include a latch to be inserted into a first space formed on one side of the third gear, the third gear may be in a locked state in which the third gear is rotated in only one direction when the latch is inserted into the first space, and the third gear may be in an unlocked state in which the third gear is rotated in both directions when the latch is separated from the first space.

Here, the latch may be fixed to be pivotally rotatable, the rotation preventing unit may further include a plurality of protrusions continuously formed along a circumference of the third gear on one side of the third gear, and an actuator for controlling pivot rotation of the latch, and the first space may be formed in plurality between the plurality of protrusions.

Here, one side of the plurality of protrusions in a circumferential direction of the third gear may be provided with a guide surface formed to be inclined.

Here, the piston and the rotating screw may be provided as a pair, and the pair of pistons may be symmetrically disposed with centers of the brake pads therebetween.

Here, the electro-mechanical brake may further include a load adjuster that is rotatably installed between the pair of rotating screws and the power transmission unit and applies a uniform load to the pair of rotating screws by pressing the rotating screw, which generates a small load when the disc is pressed, toward the disc, Here, the load adjuster may be formed to extend in length, both ends of the load adjuster may have curved surfaces toward the pair of rotating screws.

Here, the electro-mechanical brake may further include a ball nut that is coupled to the rotating screws. The rotating screws may include a first body portion to which the ball nut is coupled, a second body portion formed behind the first body portion and coupled to the second gear, and a third body portion formed between the first body portion and the second body portion. The first body portion, the second body portion, and the third body portion may be formed such that a size of a cross-section perpendicular to a longitudinal direction is sequentially decreased. The electro-mechanical brake may further include a supporter that is disposed on an outer peripheral surface of the third body portion and includes a front surface supported on an edge portion of a rear end of the first body portion, and a thrust bearing that is disposed at a rear of the supporter to support a load according to an axial force of the rotating screws. The load adjuster may press a rear side of the thrust bearing.

In an electro-mechanical brake installed on a wheel as an electro-mechanical brake according to an aspect of the present invention, in the driving state of the vehicle, a rotation speed of the wheel may be controlled by pressing the disc with the brake pads while the unlocked state is maintained, and in the parking state of the vehicle, the locked state may be maintained while the disc is pressed with the brake pads.

DETAILED DESCRIPTION OF THE INVENTION

Figure 1:
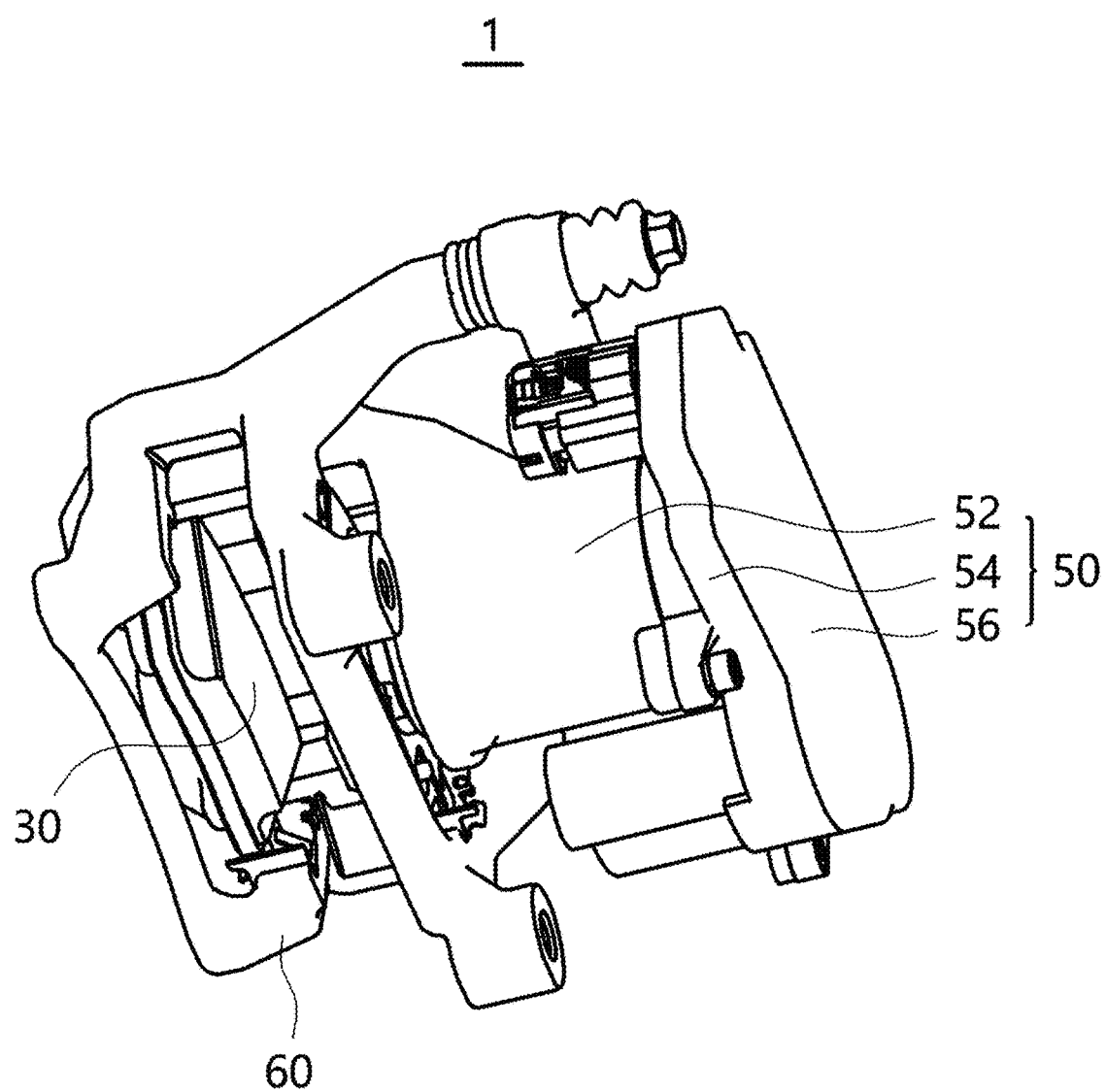
FIG. 1 is a perspective view of an electro-mechanical brake according to an embodiment of the present invention.

Hereinafter, with reference to the accompanying drawings, embodiments of the present invention will be described in detail so that those of ordinary skill in the art to which the present invention pertains can easily implement them. The present invention may be embodied in many different forms and is not limited to the embodiments described herein. Unless otherwise defined, terms used in the embodiments of the present invention may be interpreted as meanings commonly known to those of ordinary skill in the art. Hereinafter, the expression "coupled" includes not only being directly coupled, but also being coupled indirectly through other configurations.

In order to clearly explain the present invention in the drawings, parts irrelevant to the description are omitted, and the same reference numerals are assigned to the same or similar components throughout the specification.

Hereinafter, in FIG. 2, the X axis is defined as a forward direction, the Y axis is defined as a left direction, and the Z axis is defined as an upper direction. However, the forward direction does not mean that a disc should be disposed in front of a vehicle, but indicates a relative direction according to different directions.

The present invention relates to an electro-mechanical brake, and more particularly, to an electro-mechanical brake that provides a braking force by pressing a disc with a rotating screw that is rotated using the rotational driving force of a motor.

In particular, the present invention provides an electro-mechanical brake capable of reducing wear or damage to a gear by reducing the load acting on the gear through the triangular arrangement of a plurality of gears that transmits the rotational driving force of the motor.

In addition, the present invention provides an electro-mechanical brake capable of performing the functions of a parking brake and a service brake in one device using the driving force of a motor without using a conventional hydraulic method.

Figure 4:
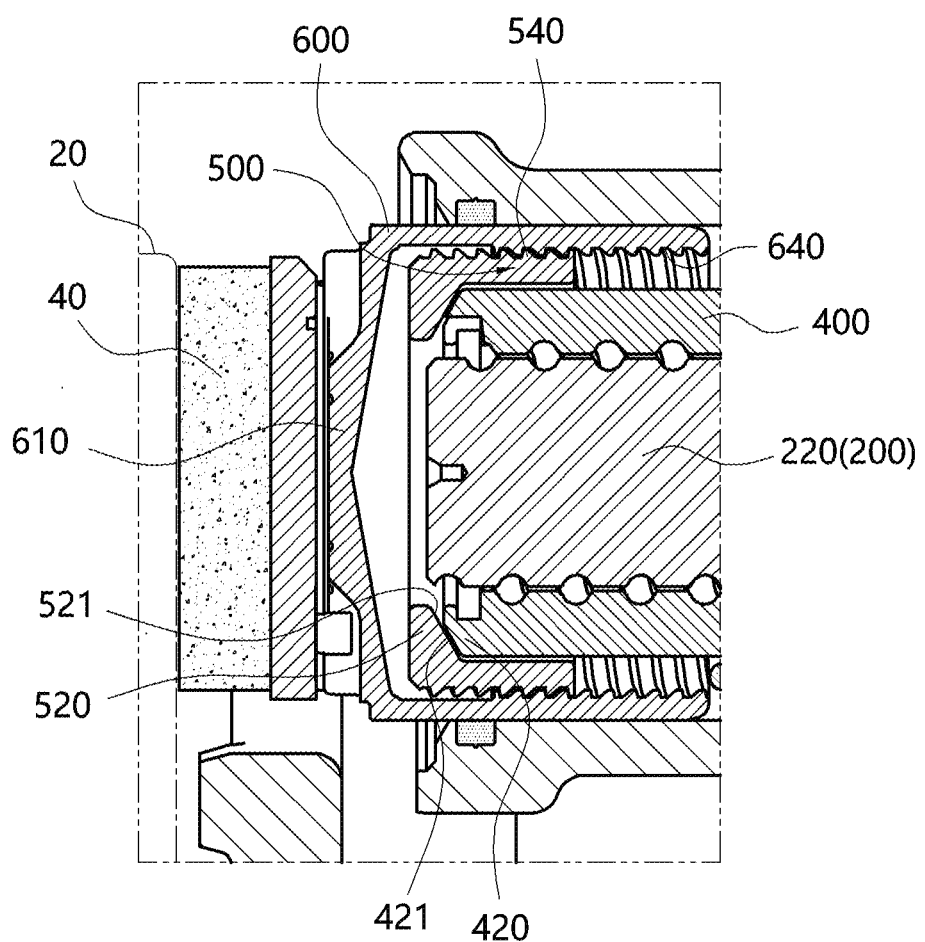
FIG. 4 is an enlarged view of part A of FIG. 3.
Figure 5:
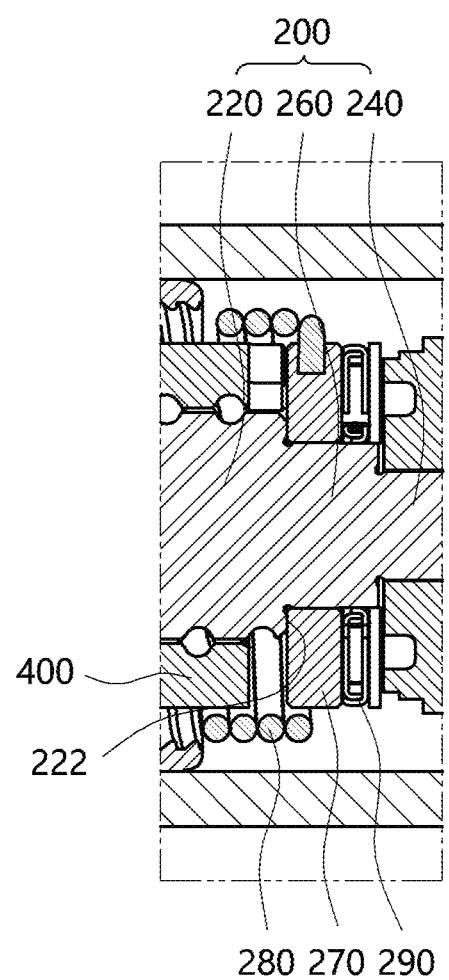
FIG. 5 is an enlarged view of part B of FIG. 3.

FIG. 1 is a perspective view of an electro-mechanical brake according to an embodiment of the present invention. FIG. 2 is an exploded perspective view of an electro-mechanical brake according to an embodiment of the present invention. FIG. 3 is a longitudinal cross-sectional view of a rotating screw and a piston of an electro-mechanical brake according to an embodiment of the present invention. FIG. 4 is an enlarged view of part A of FIG. 3. FIG. 5 is an enlarged view of part B of FIG. 3.

An electro-mechanical brake 1 according to an embodiment of the present invention includes a first brake pad 30 and a second brake pad 40 as a pair of brake pads, a housing 50, a motor 100 and a carrier 60.

Figure 2:
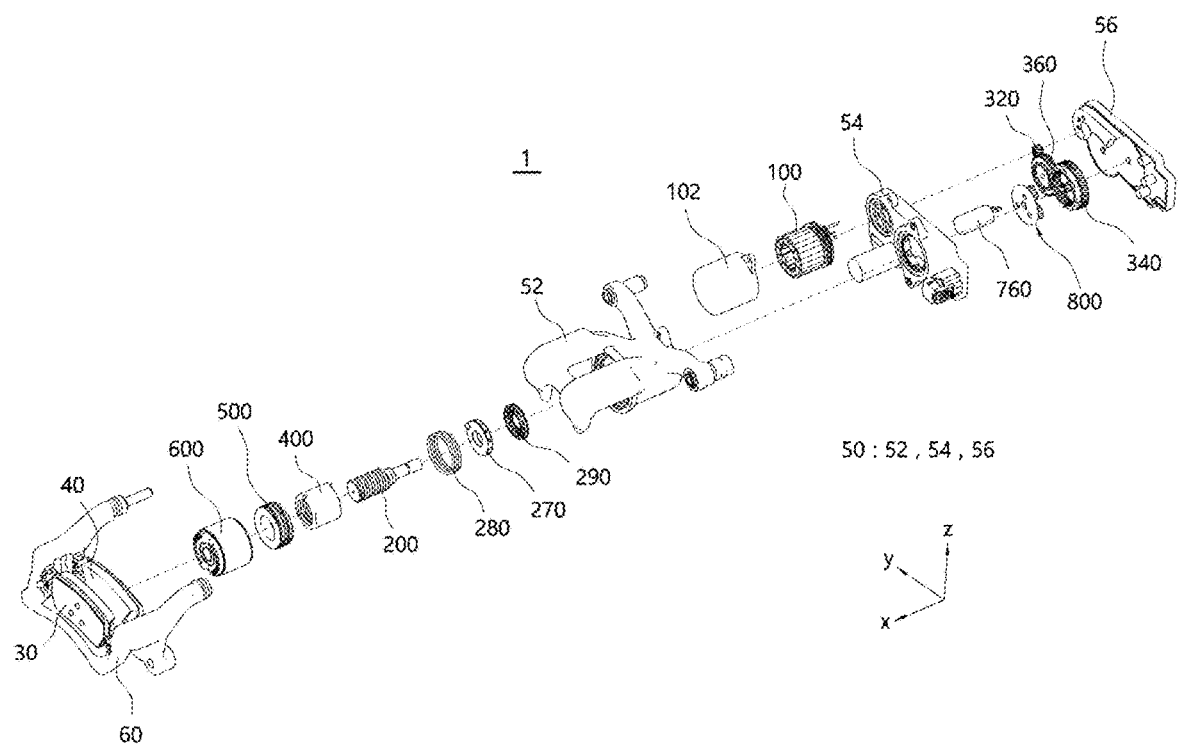
FIG. 2 is an exploded perspective view of an electro-mechanical brake according to an embodiment of the present invention.
Figure 3:
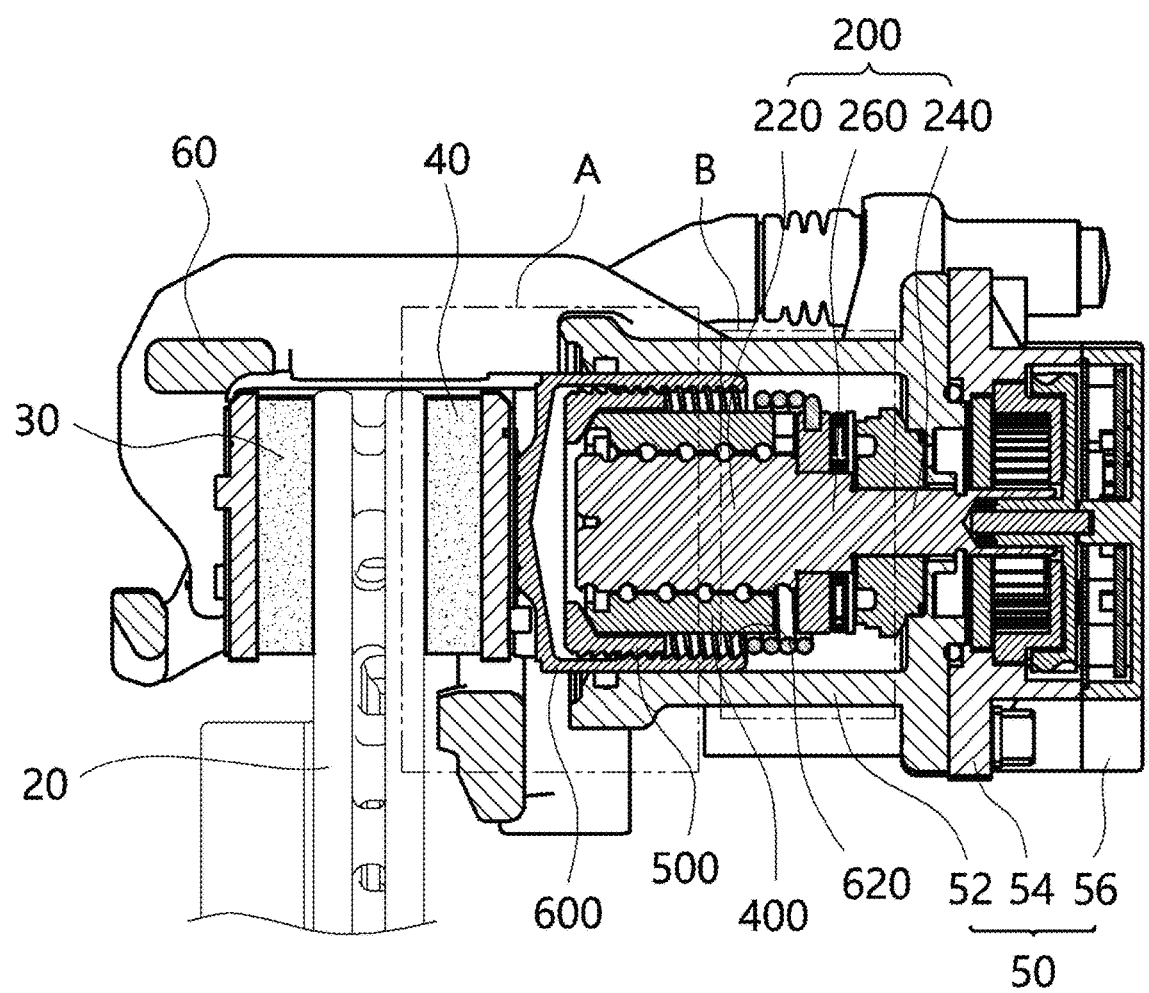
FIG. 3 is a longitudinal cross-sectional view of a rotating screw and a piston of an electro-mechanical brake according to an embodiment of the present invention.

Referring to FIGS. 1 to 3, the first brake pad 30 and the second brake pad 40 are disposed such that one surface of each is adjacent to the front and rear surfaces of the disc 20, respectively.

As shown in FIG. 1, the first brake pad 30 is coupled to the front side of the housing 50, and the housing 50 is provided with the carrier 60 installed so as to move forward and backward toward the disc 20. Here, the second brake pad 40 is coupled to the carrier 60 so that the second brake pad 40 can move forward and backward toward the disc 20 together with the carrier 60.

As shown in FIG. 2, the motor 100 that provides power to allow the second brake pad 40 or the first brake pad 30 and the second brake pad 40 to move toward the disc 20 and press the disc 20 is fixed to the inside of the housing 50. Here, as long as the motor 100 can provide a rotational driving force, there is no limitation on the type of motor such as DC, brushless DC (BLDC), or AC. As shown in FIG. 2, the motor 100 is fixed to the housing 50 so that the body faces forward, and a motor housing 102 may be coupled to the housing 50 to protect the body of the motor 100.

The housing 50 may be divided into a front housing 52, an intermediate housing 54, and a rear housing 56, as shown in FIG. 2. However, if a space is formed inside and a component can be fixed, there is no limitation on the shape of the housing. The first brake pad 30 is fixed to the front housing 52, a piston 600 to be described later is coupled to the intermediate housing 54 to move forward and backward, and a power transmission unit 300 to be described later is fixed to the rear. The rear housing 56 is coupled to the rear of the intermediate housing 54 to protect the power transmission unit 300.

As shown in FIG. 2, the electro-mechanical brake 1 according to an embodiment of the present invention includes a rotating screw 200, a piston 600, a power transmission unit 300, and a ball nut 400 to press the second brake pad 40 using the rotational driving force of the motor 100.

As shown in FIG. 2, the rotating screw 200 is formed in an elongated cylindrical shape and is disposed inside the housing to rotate by receiving the rotational driving force of the motor 100.

As shown in FIG. 3, the rotating screw 200 is provided with a first body portion 220 formed in the front, a second body portion 240 formed in the rear and a third body portion 260 formed between the first body portion 220 and the second body portion 240. The first body portion 220, the third body portion 260, and the second body portion 240 are sequentially reduced in radius as they go to the rear.

Here, the rotating screw 200 is disposed inside the housing 50 so that a first rotating shaft 321 as a rotating shaft of the motor 100 and a second rotating shaft 341 as a rotating shaft on which the rotating screw 200 rotates are arranged parallel to each other.

A ball nut 400 is coupled to the outer peripheral surface of the rotating screw 200. Here, as shown in FIG. 3, the rotating screw 200 includes the first body portion 220 to which the ball nut 400 is coupled and the second body portion 240 to which a second gear 340 is coupled to receive a driving force from the motor 100.

On the other hand, the ball nut 400 coupled to the rotating screw 200 moves forward or backward according to the rotation direction of the rotating screw 200 as the rotating screw 200 rotates by the rotational driving force of the motor 100. Since such a ball screw nut coupling is a known part, a detailed description of the coupling will be omitted.

In a brake system that provides a braking force by pressing a disc, dust is likely to be generated due to friction between the brake pad and the disc. In addition, since the brake is generally disposed on the wheels of a vehicle and disposed adjacent to a road surface, dust or foreign substance tends to rise when the wheels move on the road surface. Here, as in the electro-mechanical brake 1 according to an embodiment of the present invention, the rotating screw 200 and the ball nut 400 are combined in the form of ball screw nut, so that even if dust enters between the rotating screw 200 and the ball nut 400, the rotating screw 200 and the ball nut 400 are less damaged, thereby increasing durability.

In addition, since the rotating screw 200 and the ball nut 400 are combined in the form of ball screw nut, the electro-mechanical brake 1 according to an embodiment of the present invention has less backlash of the rotating screw 200 compared to a general screw coupling, so that the brake can be controlled more precisely.

As shown in FIG. 3, the piston 600 is disposed on the outer peripheral surface of the ball nut 400. To describe this in more detail, the piston 600 is formed in a cup shape in which an opening 620 is formed on the rear side as shown in FIGS. 2 and 3. Accordingly, the rotating screw 200 is inserted into the opening 620 so that a front end can be disposed inside the piston 600.

Accordingly, the piston 600 can move forward or backward relative to the ball nut 400 in a state in which the inner peripheral surface is in contact with the outer peripheral surface of the ball nut 400. In addition, the outer peripheral surface of the ball nut 400 serves as a guide for guiding the movement of the piston 600.

Here, when the rotating screw 200 disposed inside the piston 600 rotates, the ball nut 400 moves forward or backward according to the rotation direction of the rotating screw 200. When the ball nut 400 moves forward, the front end surface of the ball nut 400 pushes the piston 600 so that the piston 600 moves forward.

Here, the end opposite to the side of the piston 600 where the opening is formed, that is, the front end 610 of the piston 600 is in contact with the second brake pad 40. When the rotating screw 200 is further rotated, the piston 600 presses the rear surface of the second brake pad 40 so that the second brake pad 40 presses the disc 20. Accordingly, a frictional force is generated between the disc 20 and the first brake pad 30 and the second brake pad 40.

Here, as shown in FIG. 4, the electro-mechanical brake 1 according to an embodiment of the present invention may further include a connector 500.

As the first brake pad 30 and the second brake pad 40 are worn out due to friction with the disc 20, when the rear surface of the second brake pad 40 and the front surface of the piston 600 are spaced apart, the connector 500 serves to move the initial position of the piston 600 forward so that the front surface of the piston 600 can contact the second brake pad 40.

Specifically, the connector 500 is formed in a cup shape to surround the front end 420 of the ball nut 400 as shown in FIG. 4, and the ball nut 400 is inserted into the opening of the connector 500 in a cup shape. Accordingly, as shown in FIG. 4, the connector 500 is disposed between the piston 600 and the ball nut 400.

As the connector 500 is added, the ball nut 400 does not press the inner front surface of the piston 600 but presses the connector 500 as shown in FIG. 4.

Here, as shown in FIGS. 2 and 4, the connector 500 may have a front central portion which is penetrated. However, in this case, a protrusion 520 protruding from the inner peripheral surface of the front side of the connector 500 is supported in contact with the front end 420 of the ball nut 400, and accordingly, the connector 500 may move forward by the ball nut 400.

Here, as shown in FIG. 4, a support surface 521 is formed on the inner peripheral surface of the front side of the connector 500 along the circumference such that the direction in which the load for pressing the connector 500 is concentrated coincides with the extending direction of the second rotating shaft 341 when the ball nut 400 moves forward. In addition, the ball nut 400 includes an inclined surface 421 corresponding to the support surface 521 of the connector 500 so as to be in close contact with the support surface 521.

As described above, since the inclined surface 421 and the support surface 521 are inclined backward from the surface perpendicular to the second rotating shaft 341, the net force of the force of the ball nut 400 pressing the connector 500 may be focused on the central portion.

A first screw thread 540 is formed on the outer peripheral surface of the connector 500 as shown in FIG. 4. Here, a second screw thread 640 that can be screw-coupled with the first screw thread 540 is formed on the inner peripheral surface of the piston 600.

Accordingly, the connector 500 is screw-coupled to the piston 600 in a state disposed inside the piston 600, and here, the piston 600 may be rotated in the direction of the second rotating shaft 341.

The piston 600 moves forward or backward according to the rotation direction of the piston 600, and the distance between the piston 600 and the rear surface of the second brake pad 40 can be adjusted.

As shown in FIG. 5, the electro-mechanical brake 1 according to an embodiment of the present invention may further include a supporter 270, an elastic 280, and a thrust bearing 290.

As shown in FIG. 2, the supporter 270 is formed in a ring shape through which a central portion is penetrated. Here, as shown in FIG. 5, the supporter 270 penetrates through the rotating screw 200 and is disposed on the third body portion 260 of the rotating screw 200. Accordingly, the outer peripheral surface of the third body portion 260 is disposed in contact with the inner peripheral surface of the penetrated central portion of the supporter 270.

Accordingly, as shown in FIG. 5, the supporter 270 cannot move to the first body portion 220 from the third body portion 260 by a locking protrusion 222 formed in the rear edge portion of the first body portion 220.

Here, one side of the elastic 280 is coupled to the supporter 270. The other side of the elastic 280 is coupled to the ball nut 400.

The elastic 280 as a tension spring pulls the supporter 270 to the front side and pulls the ball nut 400 to the rear side. Accordingly, even if there is some error in the ball screw nut coupling, the ball nut 400 maintains a state in close contact with the rear side, so that precise braking control can be performed.

The elastic 280 may be disposed to surround the outer peripheral surfaces of the ball nut 400 and the supporter 270 as shown in FIG. 5.

Meanwhile, as shown in FIG. 5, a thrust bearing 290 is disposed on the rear end surface of the supporter 270.

When the disc 20 is pressed through the second brake pad 40 according to the rotation of the rotating screw 200, an axial force is generated in the rotating screw 200 so that the rotating screw 200 is subjected to a load backward.

The thrust bearing 290 includes a front surface in contact with the supporter 270 and a rear surface in contact with the support portion formed inside the housing 50 to support the rotating screw 200 to which the load is applied. Here, as shown in FIG. 5, a separate member fixed to the inside of the housing to support the rear surface of the thrust bearing 290 may be disposed on the rear side of the thrust bearing 290.

Figure 6:
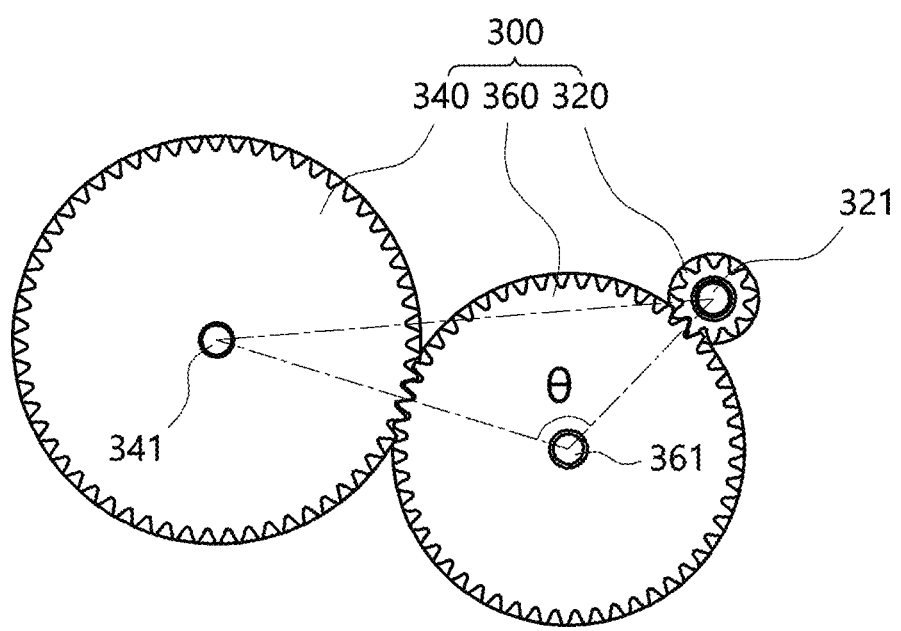
FIG. 6 is an enlarged view of a power transmission unit of an electro-mechanical brake according to an embodiment of the present invention.

FIG. 6 is an enlarged view of a power transmission unit of an electro-mechanical brake according to an embodiment of the present invention.

The electro-mechanical brake 1 according to an embodiment of the present invention includes a power transmission unit 300.

The power transmission unit 300 serves to transmit the rotational driving force of the motor 100 to the rotating screw 200. To this end, the power transmission unit 300 includes a first gear 320, a second gear 340, and a third gear 360.

Here, as shown in FIG. 6, the first gear 320 is coupled to the first rotating shaft 321 of the motor 100.

The second gear 340 is coupled to the second rotating shaft 341 of the rotating screw 200. The second gear 340 is fixed to the rear end of the rotating screw 200. Here, the portion where the second gear 340 is disposed is the second body portion 240 of the rotating screw 200.

As shown in FIG. 6, the third gear 360 is disposed between the first gear 320 and the second gear 340 to engage with the first gear 320 and the second gear 340.

Accordingly, the rotational driving force of the motor 100 is transmitted to the rotating screw 200 through the first gear 320, the third gear 360, and the second gear 340.

Here, if the first gear 320, the second gear 340, and the third gear 360 can transmit the rotational driving force from the first gear 320 to the second gear 340, the type of gears is not limited. In this embodiment, the first gear 320, the second gear 340, and the third gear 360 are helical gears as shown in FIG. 6.

Here, as shown in FIG. 6, the third gear 360 rotates around a third rotating shaft 361 spaced apart from a plane including the first rotating shaft 321 and the second rotating shaft 341. To explain this in more detail, the first rotating shaft 321, the second rotating shaft 341, and the third rotating shaft 361 do not coincide but are spaced apart from each other and are parallel to each other, and arranged so that an angle (θ) formed by a plane perpendicular to the first rotating shaft 321, the second rotating shaft 341, and the third rotating shaft 361 and a straight line connecting the point where the first rotating shaft 321 and the third rotating shaft 361 meet and a straight line connecting the point where the second rotating shaft 341 and the third rotating shaft 361 meet, has a predetermined angle.

When the rotational driving force of the motor 100 is transmitted through the arrangement structure of the first gear 320, the second gear 340, and the third gear 360, it is possible to reduce the loss due to the repulsive force that the third gear 360 receives.

On the other hand, a planetary gear structure 800 connected to the rear end of the rotating screw 200 may be disposed to adjust the rotational driving force transmitted to the rotating screw 200. Here, one side of the planetary gear structure 800 is coupled to the rotating screw 200 and the other side of the planetary gear structure 800 is connected to the second gear 340. Since the planetary gear structure 800 is a known gear structure, a detailed description thereof will be omitted.

The gear ratio of the first gear 320, the second gear 340, the third gear 360, and the planetary gear structure 800 may be designed differently depending on the magnitude of a required braking force.

Figure 7:
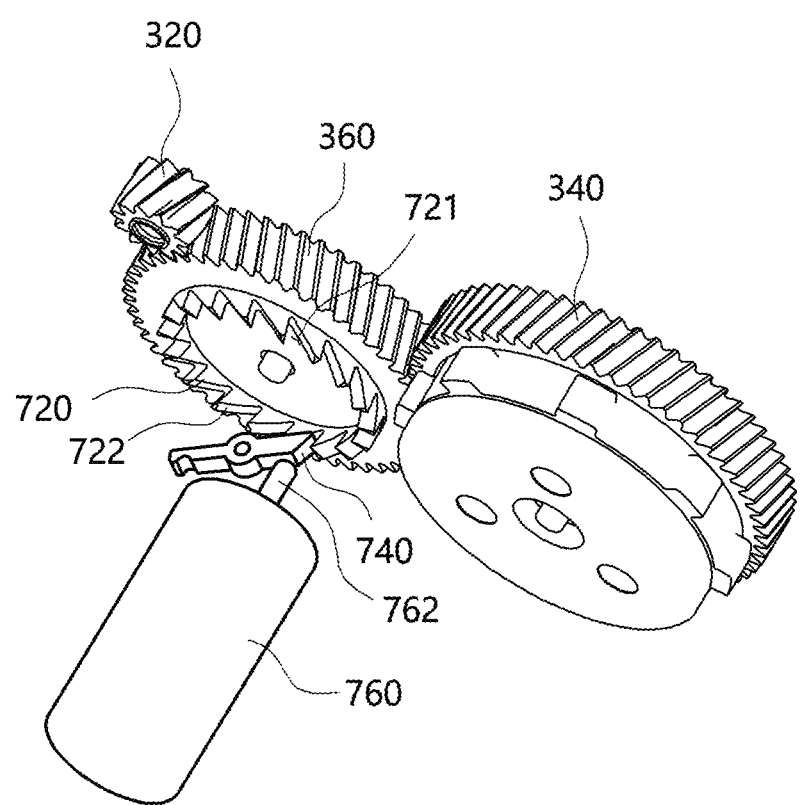
FIG. 7 is an enlarged view showing a rotation preventing unit of an electro-mechanical brake according to an embodiment of the present invention.

FIG. 7 is an enlarged view showing a rotation preventing unit of an electro-mechanical brake according to an embodiment of the present invention.

The electro-mechanical brake 1 according to an embodiment of the present invention and may further include a rotation preventing unit 700.

The rotation preventing unit 700 serves to control the third gear 360 to rotate in only one direction.

A first space 721 is formed at one side of the third gear 360 so that the rotation preventing unit 700 limits the rotation of the third gear 360. The first space 721 may be formed on the front or rear surface of the third gear 360. However, in this embodiment, as shown in FIG. 7, the first space 721 is formed on the front surface of the third gear 360.

Here, a latch 740 may be inserted into the first space 721. When the latch 740 is inserted into the first space 721, it is in a locked state in which the third gear 360 can be rotated in only one direction. In addition, when the latch 740 is separated from the first space 721, it is in an unlocked state in which the third gear 360 can be rotated in both directions.

To this end, the first space 721 is disposed along the circumference of the front surface of the third gear 360 with the third rotating shaft 361 as the center. As shown in FIG. 7, the first space 721 may be formed between a plurality of protrusions 720 protruding from the front surface of the third gear 360.

Here, the protrusion 720 may have a guide surface 722 inclined to one side so that it can be rotated only in one direction in a state in which the latch 740 is inserted.

Meanwhile, the latch 740 may pivotally rotate within the housing 50. Accordingly, one side of the latch 740 may be repeatedly inserted into or separated from the first space 721.

Here, as shown in FIG. 7, an actuator 760 is disposed inside the housing 50 to rotate the latch 740. The actuator 760 controls the rotation of the latch 740.

Here, the actuator 760 may push or pull one side of the latch 740 to rotate the latch 740. To this end, the actuator 760 may be a solenoid switch in which a permanent magnet 762 is disposed in the central portion of a coil wound a plurality of times, and the permanent magnet 762 can reciprocate by electromagnetic force of the coil.

Accordingly, as shown in FIG. 7, in the front side of the actuator 760, the front end of the permanent magnet 762 may protrude toward one side of the latch 740. Here, the side of the latch 740 toward which the permanent magnet is directed is a metal to which magnetic force can be applied, and the latch 740 may move according to the movement of the permanent magnet.

However, the method of rotating the latch 740 is not limited thereto. For example, although not shown in the drawings, the latch 740 is hinge-coupled to the front end of the permanent magnet 762 so that the latch 740 can be rotated according to the movement of the permanent magnet 762.

Space efficiency inside the housing 50 may be improved by allowing the actuator 760 to be disposed adjacent to the motor 100. Through this, the size of the electro-mechanical brake 1 can be reduced.

In addition, since the rotation preventing unit 700 is installed on the gear adjacent to the motor 100, it is possible to prevent distortion of the power transmission unit 300 in a locked state in which the latch 740 supports the protrusion 720.

Hereinafter, the operation of the electro-mechanical brake 1 according to an embodiment of the present invention will be described in detail with reference to FIGS. 8 and 9.

Figure 8:
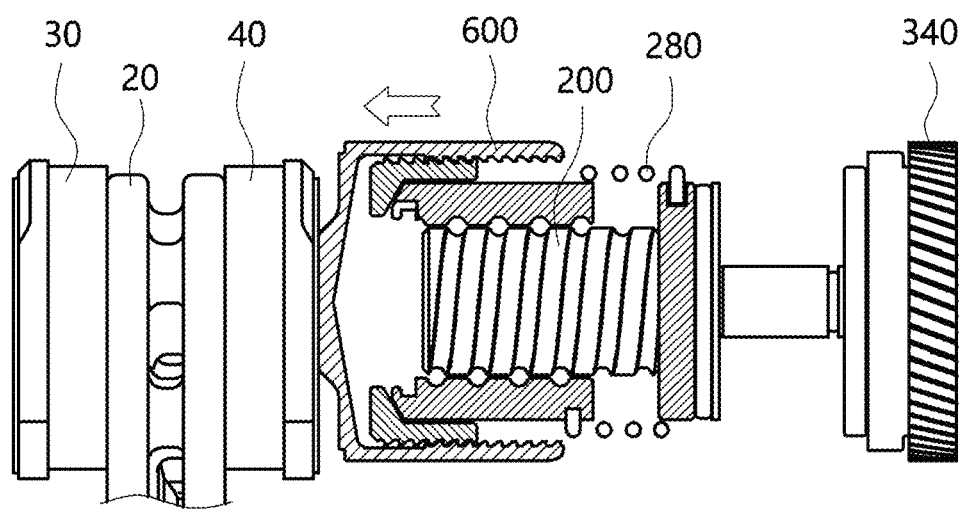
FIG. 8 is a view showing a braking state of an electro-mechanical brake according to an embodiment of the present invention.

FIG. 8 is a view showing a braking state of an electro-mechanical brake according to an embodiment of the present invention. FIG. 9 is a view showing a driving state of an electro-mechanical brake according to an embodiment of the present invention.

As shown in FIGS. 3 and 8, in a state where the electro-mechanical brake 1 presses the disc 20, the rotational driving force generated from the motor 100 is transmitted through the power transmission unit 300 to the rotating screw 200.

Accordingly, the rotating screw 200 rotates and the ball nut 400 moves forward relative to the rotating screw 200. Here, the connector 500 surrounding the first body portion 220 of the rotating screw 200 presses the piston 600, and presses the disc 20 through the second brake pad 40.

Here, in order to maintain the braking state in which the disc 20 is pressed as described above, although not shown in FIG. 8, the latch 740 is inserted into the first space 721 using an actuator 760 to convert into a locked state.

Figure 9:
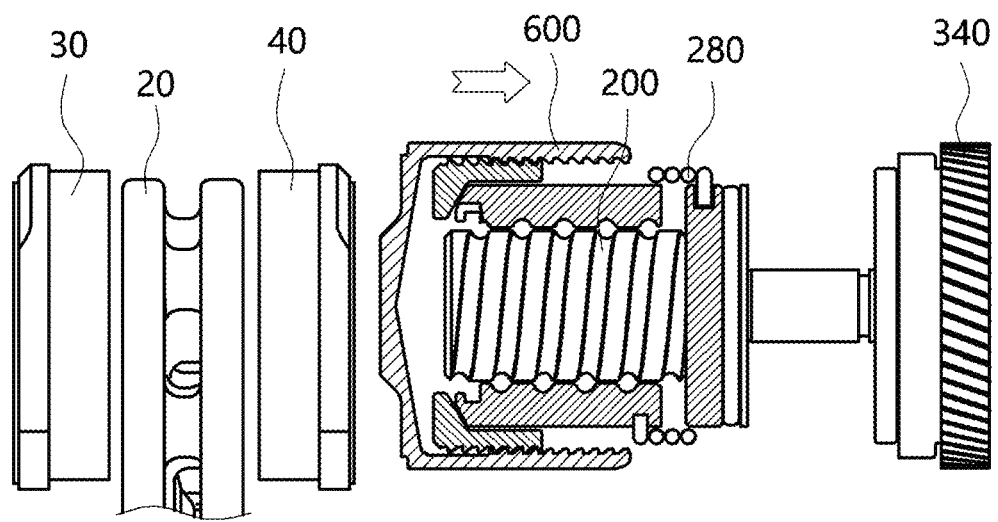
FIG. 9 is a view showing a driving state of an electro-mechanical brake according to an embodiment of the present invention.

On the other hand, as shown in FIG. 9, when pressing the disc 20 is stopped and the vehicle is in a driving state, the motor 100 applies a rotational driving force in the opposite direction to the rotating screw 200 through the power transmission unit 300.

When the rotating screw 200 rotates in the opposite direction and the ball nut 400 moves backward relative to the rotating screw 200, the piston 600 no longer presses the second brake pad 40. Accordingly, the disc 20 can rotate without restriction.

Figure 10:
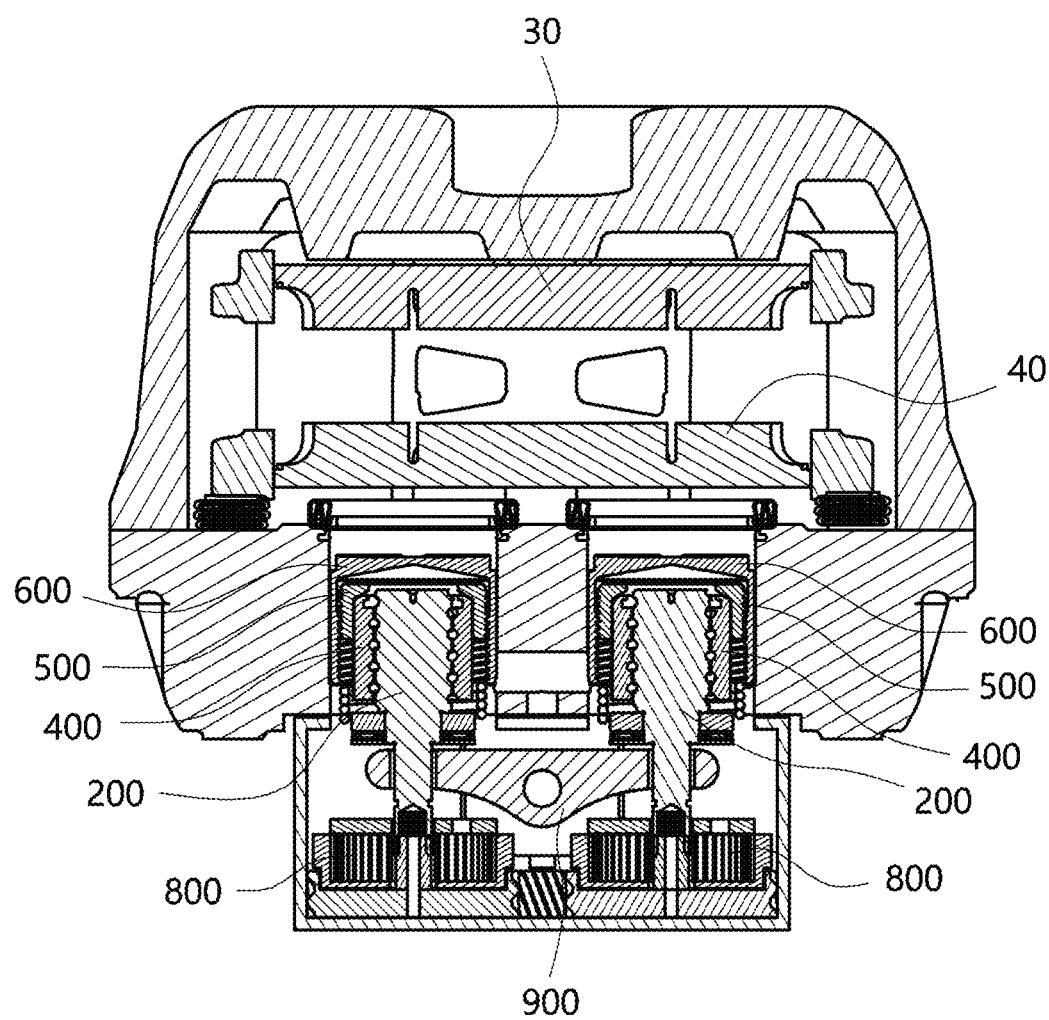
FIG. 10 is a longitudinal cross-sectional view of a pair of rotating screws and a pair of pistons of an electro-mechanical brake according to another embodiment of the present invention.
Figure 11:
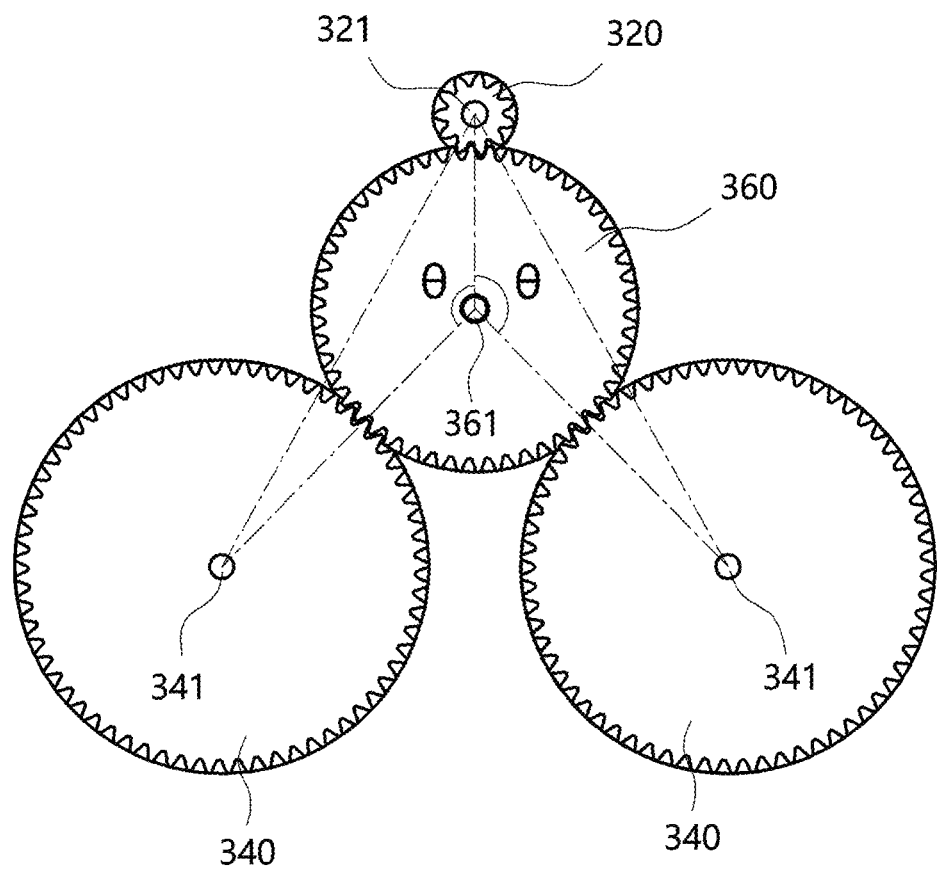
FIG. 11 is an enlarged view showing a power transmission unit of an electro-mechanical brake according to another embodiment of the present invention.
Figure 12:
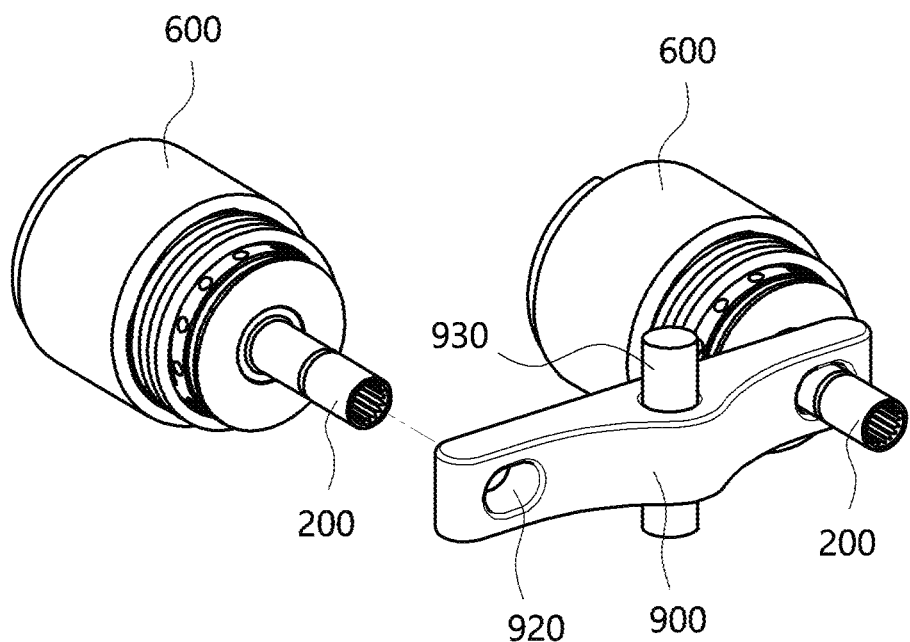
FIG. 12 is an enlarged view showing a load adjuster of an electro-mechanical brake according to another embodiment of the present invention.
Figure 13:
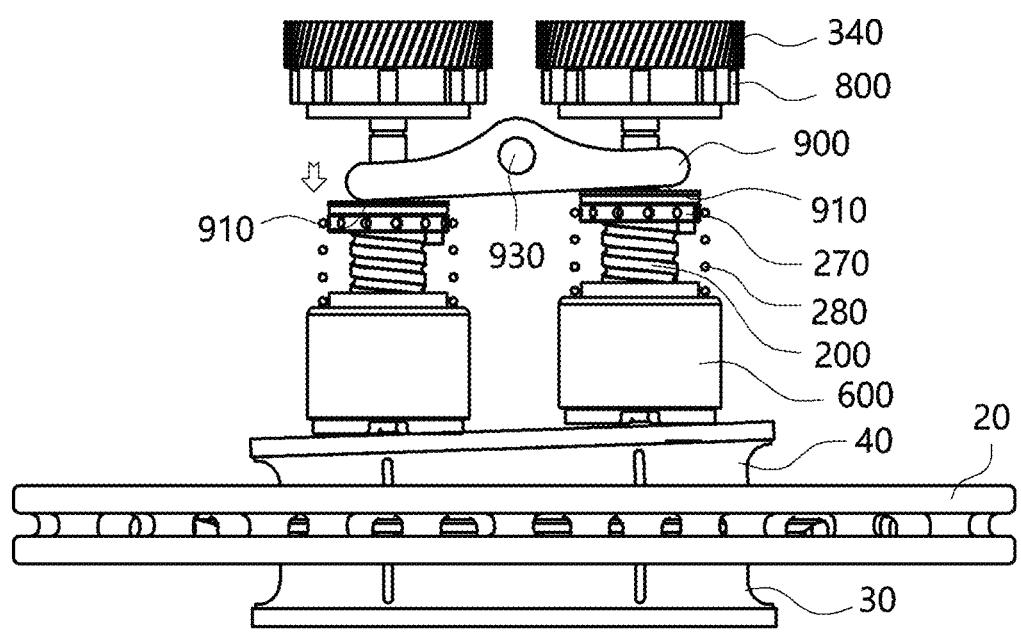
FIG. 13 is a view showing an operating state of a load adjuster of an electro-mechanical brake according to another embodiment of the present invention.

FIG. 10 is a longitudinal cross-sectional view of a pair of rotating screws and a pair of pistons of an electro-mechanical brake according to another embodiment of the present invention. FIG. 11 is an enlarged view of a power transmission unit of an electro-mechanical brake according to another embodiment of the present invention. FIG. 12 is an enlarged view showing a load adjuster of an electro-mechanical brake according to another embodiment of the present invention. FIG. 13 is a view showing an operating state of a load adjuster of an electro-mechanical brake according to another embodiment of the present invention.

The electro-mechanical brake 1 according to another embodiment of the present invention is provided with a pair of the pistons 600 and a pair of the rotating screws 200. Here, since the piston 600 and the rotating screw 200 are the same as the above described piston 600 and rotating screw 200, a redundant description thereof will be omitted.

The pair of the pistons 600 and the pair of the rotating screws 200 are disposed inside the housing 50 as shown in FIG. 10. Here, the shape of the housing 50 may be changed as needed so that the pair of the pistons 600 and the pair of the rotating screws 200 can be disposed.

The pair of rotating screws 200 coupled to the pair of pistons 600 is connected to one motor 100 as shown in FIG. 11 to receive a rotational driving force.

Here, as shown in FIG. 11, one third gear 360 is disposed between the first gear 320 coupled to the motor 100 and the second gears 340 respectively coupled to the second body portions 240 of the pair of rotating screws 200.

Here, the first gear 320, the second gear 340, and the third gear 360 are arranged so that the angle (θ) formed by a line connecting the rotation center of the third gear 360 and the rotation center of the first gear 320 and a line connecting the rotation center of the third gear 360 and the rotation center of the second gear 340 has a predetermined angle.

Here, as shown in FIG. 11, in order for each rotating screw 200 to receive a uniform rotational driving force, the pair of second gears 340 is symmetrically disposed on both sides of the first gear 320 and the third gear 360 and engaged with the third gear 360.

On the other hand, when the second brake pad 40 is pressed by the pair of pistons 600, as shown in FIG. 10, in order to apply a uniform load, the pair of pistons 600 is arranged symmetrically with the center of the second brake pad interposed therebetween.

A stronger braking force may be provided when the second brake pad 40 is pressed by the pair of pistons 600, but if one piston 600 more strongly presses one side of the second brake pad 40, wearing may progress first on one side of the second brake pad 40.

Here, if the second brake pad 40 is not evenly contacted with the disc 20 due to asymmetry, frictional force may decrease, resulting in a decrease in braking force.

To this end, as shown in FIG. 12, the electro-mechanical brake 1 according to another embodiment of the present invention may further include a load adjuster 900.

The load adjuster 900 applies a uniform load to the pair of rotating screws 200 by pressing the rotating screw 200, which generates a small load when the disc 20 is pressed, toward the disc 20.

The load adjuster 900 is rotatably installed between the pair of rotating screws 200 and the power transmission unit 300. Here, as shown in FIG. 12, the load adjuster 900 is formed to extend in length. A shaft extending in the longitudinal direction of the load adjuster 900 and the pair of second rotating shafts 341 are vertically disposed.

A pin 930 passes through the load adjuster 900 in the center. Here, the pin 930 is disposed perpendicular to the plane formed by the pair of second rotating shafts 341. The pin 930 is fixed to the inside of the housing 50.

As shown in FIGS. 10 and 12, both ends 910 of the load adjuster 900 have curved surfaces toward the rotating screws 200. Here, the curved surface formed on the load adjuster 900 presses the rear surface of the supporter 270 installed on the third body portion 260 of the rotating screw 200 or the rear surface of the thrust bearing 290 disposed behind the supporter 270.

As shown in FIG. 12, a pair of through holes 920 is formed at both ends of the load adjuster 900. A rear end of the rotating screw 200 penetrates through each of the pair of through holes 920.

Here, as shown in FIG. 13, even if one piston 600 presses the second brake pad 40 because one side of the brake pad is worn, the force of the other piston 600 pressing the second brake pad 40 is reduced.

Here, one piston 600 receives an axial force rearward, whereby the load adjuster 900 rotates toward the other piston 600.

Accordingly, as the end of the load adjuster 900 on the other piston 600 presses the supporter 270 or the thrust bearing 290 on the other piston 600, the other piston 600 may sufficiently press the second brake pad 40.

Accordingly, even when one side of the brake pad is worn, the pair of pistons 600 can press the second brake pad 40 with a uniform load.

The electro-mechanical brake 1 according to various embodiments of the present invention has been described above. A plurality of gear arrangement structures for efficiently transmitting the rotational driving force of the motor and increasing the durability of internal components while using the motor to press the disc, according to the present invention, has been described in the present specification. Further, the present invention has been described with respect to a structure capable of uniformly pressing the second brake pad by arranging a pair of pistons while using one motor. Still further, an electro-mechanical brake capable of performing the roles of a service brake and a parking brake with one motor even without a separate parking brake operating as a hydraulic line by having a rotation preventing unit has been described.

It is apparent to those skilled in the art to which the present invention pertains that the electro-mechanical brake according to this embodiment is not applicable only to the brake system of a vehicle, and may be used as a brake for braking a rotating object.

The electro-mechanical brake according to an embodiment of the present invention may provide a braking force to a vehicle by pressing the disc using the driving force of the motor.

The electro-mechanical brake according to an embodiment of the present invention may reduce the load applied to the plurality of gears to increase durability by arranging three gears in a specific arrangement to transmit the driving force of the motor, The electro-mechanical brake according to an embodiment of the present invention may provide service brake and parking brake functions electronically without a hydraulic line.

The electro-mechanical brake according to an embodiment of the present invention is provided with a ball nut, so that the damage is relatively small and the backlash of the rotating screw is small in a brake environment where dust and foreign substances are easily generated.

The electro-mechanical brake according to an embodiment of the present invention can provide sufficient braking forces even when the brake pad is worn by having the connector.

The electro-mechanical brake according to an embodiment of the present invention may maintain the braking force of the brake in a parking situation.

The electro-mechanical brake according to an embodiment of the present invention may apply a uniform load to the plurality of pistons through the single motor.

It should be understood that the effects of the present invention are not limited to the above-described effects, and include all effects that can be inferred from the configuration of the invention described in the description or claims of the present invention.

As described above, preferred embodiments according to the present invention have been reviewed, and the fact that the present invention can be embodied in other specific forms without departing from the spirit or scope of the present invention in addition to the above-described embodiments will be apparent to one of ordinary skill in the art. Therefore, the above-described embodiments are to be regarded as illustrative rather than restrictive, and accordingly, the present invention is not limited to the above description, but may be modified within the scope of the appended claims and their equivalents.

DESCRIPTION OF REFERENCE NUMERALS

| | | | |
|---|---|---|---|
| 1 | electro-mechanical brake | 360 | third gear |
| 20 | disc | 361 | third rotating shaft |
| 30 | first brake pad | 400 | ball nut |
| 40 | second brake pad | 421 | inclined surface |
| 50 | housing | 500 | connector |
| 60 | carrier | 520 | protrusion |
| 100 | motor | 521 | support surface |
| 200 | rotating screw | 540 | first screw thread |
| 220 | first body portion | 600 | piston |
| 240 | second body portion | 620 | opening |
| 260 | third body portion | 640 | second screw thread |
| 270 | supportor | | |
| 700 | rotation preventing unit | | |

-continued

DESCRIPTION OF REFERENCE NUMERALS

| | | | |
|---|---|---|---|
| 280 | elastic | 720 | protrusion |
| 290 | thrust bearing | 721 | first space |
| 300 | power transmission unit | 722 | guide surface |
| 320 | first gear | 740 | latch |
| 321 | first rotating shaft | 760 | actuator |
| 340 | second gear | | |
| 800 | planetary gear structure | | |
| 341 | second rotating shaft | 900 | load adjuster |

What is claimed is:

1. An electro-mechanical brake comprising a pair of brake pads disposed on both sides of a disc, comprising:
    a motor that provides a rotational driving force;
    a rotating screw that rotates about a second rotating shaft parallel to a first rotating shaft of the motor;
    a power transmission unit that transmits the rotational driving force of the motor to the rotating screw;
    a piston that is coupled to the rotating screw to be able to move forward and backward to press the disc with the brake pads; and
    a ball nut that is coupled to the rotating screw,
    wherein the power transmission unit includes a first gear coupled to the first rotating shaft of the motor, a second gear coupled to the second rotating shaft of the rotating screw, and a third gear engaging with the first gear and the second gear and rotating about a third rotating shaft spaced apart from a plane including the first rotating shaft and the second rotational shaft,
    the rotating screw includes a first body portion to which the ball nut is coupled, a second body portion formed behind the first body portion and coupled to the second gear, and a third body portion formed between the first body portion and the second body portion,
    the piston is formed in a cup shape with an opening at a rear thereof,
    the ball nut is inserted into the opening of the piston to press the piston forward,
    the first body portion, the third body portion, and the second body portion are formed such that a size of a cross-section perpendicular to a longitudinal direction is sequentially decreased,
    wherein the electro-mechanical brake comprises a supporter that is disposed on an outer peripheral surface of the third body portion and includes a front surface supported on an edge portion of a rear end of the first body portion, and
    an elastic that includes one side coupled to the supporter and the other side coupled to the ball nut to pull the ball nut toward the supporter.

2. The electro-mechanical brake according to claim 1, further comprising a planetary gear structure that includes one side coupled to a rear end of the rotating screw,
    wherein the second gear is coupled to the other side of the planetary gear structure.

3. The electro-mechanical brake according to claim 1, wherein the first gear, the second gear and the third gear are helical gears.

4. The electro-mechanical brake according to claim 1, further comprising a connector that is formed to surround a front end of the ball nut in order to be pressed forward by the ball nut, and includes a first screw thread formed on an outer peripheral surface thereof, wherein a second screw thread screw-coupled to the first screw thread is formed on an inner peripheral surface of the piston.

5. The electro-mechanical brake according to claim 4, wherein an inclined surface is formed on a front edge portion of the ball nut along a circumference,
a support surface corresponding to the inclined surface is formed on an inner peripheral surface of a front side of the connector so as to be pressed by the inclined surface.

6. The electro-mechanical brake according to claim 1, wherein the elastic is formed in a spiral shape surrounding outer peripheral surfaces of the ball nut and the supporter.

7. The electro-mechanical brake according to claim 6, further comprising a thrust bearing disposed at a rear of the supporter to support a load according to an axial force of the rotating screw.

8. The electro-mechanical brake according to claim 1, further comprising a rotation preventing unit that controls the third gear to rotate in only one direction.

9. The electro-mechanical brake according to claim 8, wherein the rotation preventing unit includes a latch to be inserted into a first space formed on one side of the third gear,
the third gear is in a locked state in which the third gear is rotated in only one direction when the latch is inserted into the first space, and the third gear is in an unlocked state in which the third gear is rotated in both directions when the latch is separated from the first space.

10. The electro-mechanical brake according to claim 9, wherein the latch is fixed to be pivotally rotatable,
the rotation preventing unit further includes a plurality of protrusions continuously formed along a circumference of the third gear on one side of the third gear, and an actuator for controlling pivot rotation of the latch, and
the first space is formed in plurality between the plurality of protrusions.

11. The electro-mechanical brake according to claim 10, wherein one side of the plurality of protrusions in a circumferential direction of the third gear is provided with a guide surface formed to be inclined.

12. A vehicle provided with an electro-mechanical brake, comprising:
the electro-mechanical brake according to claim 9;
a wheel to which the disc is coupled to one side so that the rotating shafts coincide; and
the pair of brake pads that is disposed on both sides of the disc and coupled to the electromechanical brake,
wherein in a driving state, a rotation speed of the wheel is controlled by pressing the disc with the brake pads while the unlocked state is maintained,
in a parking state, the locked state is maintained while the disc is pressed with the brake pads.

\* \* \* \* \*